US012739899B2

(12) United States Patent
Xu

(10) Patent No.: US 12,739,899 B2
(45) Date of Patent: Sep. 15, 2026

(54) METHOD AND APPARATUS FOR ESTABLISHING BLUETOOTH LINK, DEVICE, AND STORAGE MEDIUM

(71) Applicant: GUANGDONG OPPO MOBILE TELECOMMUNICATIONS CORP., LTD., Dongguan (CN)

(72) Inventor: Chaojie Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 399 days.

(21) Appl. No.: 18/515,990

(22) Filed: Nov. 21, 2023

(65) Prior Publication Data

US 2024/0090049 A1 Mar. 14, 2024

Related U.S. Application Data

(63) Continuation of application No. PCT/CN2022/085146, filed on Apr. 2, 2022.

(30) Foreign Application Priority Data

May 24, 2021 (CN) ........................ 202110565801.2

(51) Int. Cl.
*H04W 76/10* (2018.01)
*H04W 68/02* (2009.01)
*H04W 84/18* (2009.01)

(52) U.S. Cl.
CPC ........... *H04W 76/10* (2018.02); *H04W 68/02* (2013.01); *H04W 84/18* (2013.01)

(58) Field of Classification Search
CPC ..... H04W 76/10; H04W 68/02; H04W 84/18; H04W 12/00; H04W 4/80; H04W 76/14; H04W 84/20
See application file for complete search history.

(56) References Cited

U.S. PATENT DOCUMENTS 10,159,105 B1 * 12/2018 Linsky .................... H04L 69/24
2012/0224607 A1 * 9/2012 Sun ...................... H04B 1/7156 375/133

(Continued)

FOREIGN PATENT DOCUMENTS

CN 106341516 A 1/2017
CN 110191442 A 8/2019

(Continued)

OTHER PUBLICATIONS

First Office Action issued in corresponding CN application No. 202110565801.2 dated Nov. 29, 2024, 13 pages.

(Continued)

*Primary Examiner* — Cindy Trandai
(74) *Attorney, Agent, or Firm* — Sheppard, Mullin, Richter & Hampton LLP

(57) ABSTRACT

Establishing a Bluetooth link may include: transmitting, by a master Bluetooth device, a connection notification to a slave Bluetooth device, the connection notification being configured to indicate the slave Bluetooth device as an agent of the master Bluetooth device to initiate paging to a second target device; initiating, by the slave Bluetooth device, paging to the second target device; transmitting, by the slave Bluetooth device in response that the second target device is paged successfully, connection information to the master Bluetooth device, the connection information being configured for the master Bluetooth device to perform continuous communication with the second target device; and establishing, by the master Bluetooth device, a second Bluetooth link with the second target device based on the connection information.

10 Claims, 5 Drawing Sheets

(56) References Cited

U.S. PATENT DOCUMENTS

| | | | | |
|---|---|---|---|---|
| 2012/0237053 | A1* | 9/2012 | Alam | H04R 5/04 381/80 |
| 2016/0262193 | A1* | 9/2016 | Hariharan | H04W 76/10 |
| 2020/0128458 | A1* | 4/2020 | Yang | H04W 36/00837 |
| 2020/0322788 | A1* | 10/2020 | Batra | H04W 8/24 |
| 2021/0051458 | A1* | 2/2021 | Cheong | H04W 4/80 |
| 2021/0076435 | A1* | 3/2021 | Cheong | H04L 9/3215 |
| 2021/0203454 | A1* | 7/2021 | Cheong | H04L 1/1812 |
| 2021/0282207 | A1* | 9/2021 | Cheong | H04W 4/80 |
| 2022/0039179 | A1* | 2/2022 | Chen | H04R 1/1016 |
| 2022/0141918 | A1* | 5/2022 | Xu | H04W 4/80 455/41.2 |
| 2023/0189367 | A1* | 6/2023 | Xie | H04W 76/16 455/422.1 |

FOREIGN PATENT DOCUMENTS

| | | | |
|---|---|---|---|
| CN | 111050306 | A | 4/2020 |
| CN | 112055349 | A | 12/2020 |
| CN | 112399390 | A | 2/2021 |

OTHER PUBLICATIONS

International Search Report and Written Opinion dated Jul. 1, 2022 in International Application No. PCT/CN2022/085146. English translation attached.

* cited by examiner

METHOD AND APPARATUS FOR ESTABLISHING BLUETOOTH LINK, DEVICE, AND STORAGE MEDIUM

CROSS-REFERENCE TO RELATED APPLICATIONS

The present application is a continuation of International Application No. PCT/CN2022/085146 filed on Apr. 2, 2022, which claims priority to Chinese Patent Application No. 202110565801.2, titled "METHOD AND APPARATUS FOR ESTABLISHING BLUETOOTH LINK, DEVICE, AND STORAGE MEDIUM" and filed on May 24, 2021, which is incorporated herein by reference in its entirety.

FIELD

Embodiments of the present disclosure relate to the technical field of wireless communications, and more particularly, to a method and apparatus for establishing a Bluetooth link, a device, and a storage medium.

BACKGROUND

Wireless communication may be performed between two devices supporting a Bluetooth function by establishing a Bluetooth link.

In some scenarios, one Bluetooth device needs to establish the Bluetooth link with a plurality of target devices. For example, a Bluetooth earphone establishes the Bluetooth link with both two mobile phones, or the Bluetooth earphone establishes the Bluetooth link with both one mobile phone and one notebook computer. The related art supports the Bluetooth device to establish the Bluetooth link with the plurality of target devices in series, i.e., after the Bluetooth device establishes the Bluetooth link with one target device successfully or fails to establish the Bluetooth link with one target device because of a timeout, the Bluetooth device establishes the Bluetooth link with another target device.

Obviously, this serial connection manner requires more time and is low in efficiency.

SUMMARY

The embodiments of the present disclosure provide a method and apparatus for establishing a Bluetooth link, a device, and a storage medium. The technical solutions will be described as follows.

According to an aspect of an embodiment of the present disclosure, provided is a method for establishing a Bluetooth link in a master Bluetooth device. The method includes: transmitting a connection notification to a slave Bluetooth device, the connection notification being configured to indicate the slave Bluetooth device as an agent of the master Bluetooth device to initiate paging to a second target device; receiving connection information from the slave Bluetooth device, the connection information being configured for the master Bluetooth device to perform continuous communication with the second target device; and establishing a second Bluetooth link with the second target device based on the connection information.

According to an aspect of an embodiment of the present disclosure, provided is a method for establishing a Bluetooth link in a slave Bluetooth device. The method includes: receiving a connection notification from a master Bluetooth device, the connection notification being configured to indicate the slave Bluetooth device as an agent of the master Bluetooth device to initiate paging to a second target device; initiating paging to the second target device; and transmitting, in response that the second target device is paged successfully, connection information to the master Bluetooth device. The connection information is configured for the master Bluetooth device to perform continuous communication with the second target device, to establish a second Bluetooth link between the master Bluetooth device and the second target device.

According to an aspect of an embodiment of the present disclosure, provided is a Bluetooth device. The Bluetooth device includes a processor and a memory having a computer program stored therein. The computer program, when executed by the processor, implements the method at the master Bluetooth device described above or the method at the slave Bluetooth device described above.

DETAILED DESCRIPTION

In order to make the objects, technical solutions, and advantages of the present disclosure more apparent, implementations of the present disclosure will be further described in detail below in combination with accompanying drawings.

Before the technical solution of the present disclosure is introduced and described, some background knowledge of Bluetooth technology is first introduced and described.

Figures 1, 2:
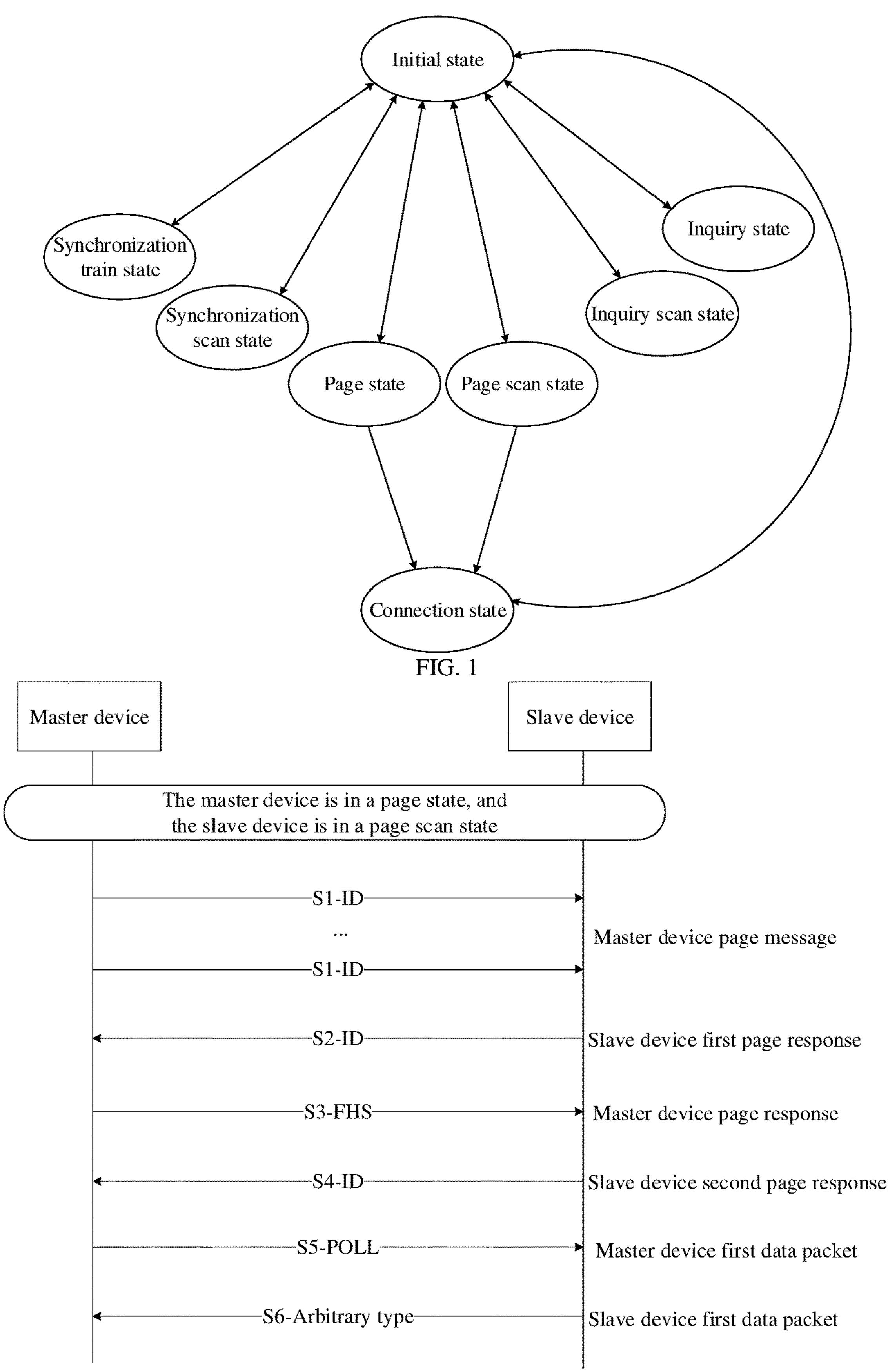
FIG. 1 exemplarily illustrates a state diagram of a Bluetooth device.
FIG. 2 exemplarily illustrates a flowchart of a Bluetooth link establishment process.

FIG. 1 exemplarily illustrates a state diagram of a Bluetooth device.

Inquiry state. Once the device intends to discover a new device, the device enters the inquiry state. At this time, the device broadcasts its ID Packet to all devices within a specified range, and the packet includes an Inquiry Access Code (IAC). The packet is transmitted out by using an inquiry hopping sequence. The device in the inquiry state may also receive FHS packets, but does not confirm the packets.

Inquiry scan state. When the device wants to receive the ID packet, the device enters the inquiry scan state. The scanning is performed as the inquiry hopping sequence.

Page state. Page state is a state that a device enters when searching for other devices. The device uses a page hopping sequence to transmit an ID packet, which is used to notify other devices. Moreover, the device is intended to understand other devices and services thereof.

Page scan state. In the page scan state, the device monitors a page sequence containing its own Device Access Code (DAC). Once the device wishes to receive a page data packet, the device enters the page scan state, and the scan is performed according to the page hopping sequence. In response that the device receives one ID packet, the device may enter a slave response state.

A synchronization train state and a synchronization scan state are of little relevance to the technical solution of the present disclosure. Therefore, details are omitted herein.

When two devices need to establish a Bluetooth link, one of the two devices enters the page state, and another one of the two devices enters the page scan state. The two devices use a same page hopping sequence. When jumping to a same frequency point, the Bluetooth link is established between the two devices. We refer to a device initiating paging as a master device and a device performing page scanning as a slave device.

FIG. 2 exemplarily illustrates a flowchart of a Bluetooth link establishment process. As illustrated in FIG. 2, the process may include six steps (S1 to S6) illustrated in Table 1 below.

TABLE 1

| Step | Message | Packet type | Direction | Hopping sequence | Access code and clock |
|---|---|---|---|---|---|
| S1 | Page | ID | Master to slave | Page | Slave |
| S2 | Slave device first page response | ID | Slave to master | Page response | Slave |
| S3 | Master device page response | FHS | Master to slave | Page | Slave |
| S4 | Slave device second page response | ID | Slave to master | Page response | Slave |
| S5 | Master device first data packet | POLL | Master to slave | Channel | Master |
| S6 | Slave device first data packet | Arbitrary type | Slave to master | Channel | Master |

Multifarious packet types are defined in a baseband layer of a Bluetooth system, and higher layers use the packets to form a high-level Protocol Data Unit (PDU). The above packet types include: ID, NULL, POLL, Frequency Hop Synchronization (FHS), DM1; and these packets are defined in a Synchronous Connection Oriented Link (SCO) and an Asynchronous Connectionless Link (ACL). DH1, AUX1, DM3, DH3, DM5, and DH5 are only defined in the ACL. HV1, HV2, HV3, DV are only defined in the SCO.

In the Bluetooth link establishment process, three types of packets, i.e., ID, FHS, and POLL, are mainly involved.

The ID packet is a 68-bit data packet for page, inquiry, and response processes, mainly composed of the DAC or the IAC.

The FHS packet is a special control packet, including a Bluetooth Device Address of the device and clock information of a source device. It includes 144 information bits and a 16-bit Cyclic Redundancy Check (CRC) code. Payload uses ⅔ Forward Error Correction (FEC) encoding, so that a total length of the payload can reach 240 bits. The FHS packet covers a single slot.

A POLL packet is similar to a NULL packet (i.e., an empty packet). The NULL packet is a packet with a length of 126 bits, is formed only by a Channel Access Code (CAC) and a packet header, and is used to return connection information to the source device. Moreover, the NULL packet is not necessarily confirmed. A difference between the POLL packet and the NULL packet is that the POLL packet requires confirmation from a destination device. Once the POLL packet of the master device is received, the slave device must transmit back a packet for response.

In the above step S1, the master device transmits a high-frequency ID packet, which uses a highest priority level from software, occupies a very high bandwidth from an air interface, and generally not supports a concurrent page process. Therefore, the current related art only supports a serial connection of Bluetooth. When one Bluetooth device needs to be connected to a plurality of target devices, one target device must be connected first, and then another target device is connected. In response that a first target device does not turn on the Bluetooth, or exceeds a connectable range of the Bluetooth, it is necessary to wait until a connection timeout occurs, and another Bluetooth device can be connected. The overall required time is long, efficiency is low, and a user experience is affected.

The present disclosure provides a method for establishing a Bluetooth link. A master Bluetooth device uses a slave Bluetooth device as an agent of the master Bluetooth device to initiate paging to a target device, thereby effectively overcoming limitation in which a single Bluetooth device cannot initiate paging to a plurality of target devices simultaneously. It is realized that the master Bluetooth device initiates paging to one target device, and in parallel, the slave Bluetooth device as the agent for the master Bluetooth device to initiate paging to another target device, thereby realizing parallel paging of the two target devices. Therefore, the time consumed for establishing a plurality of Bluetooth links is shortened, and the efficiency is enhanced.

Figures 3, 4:
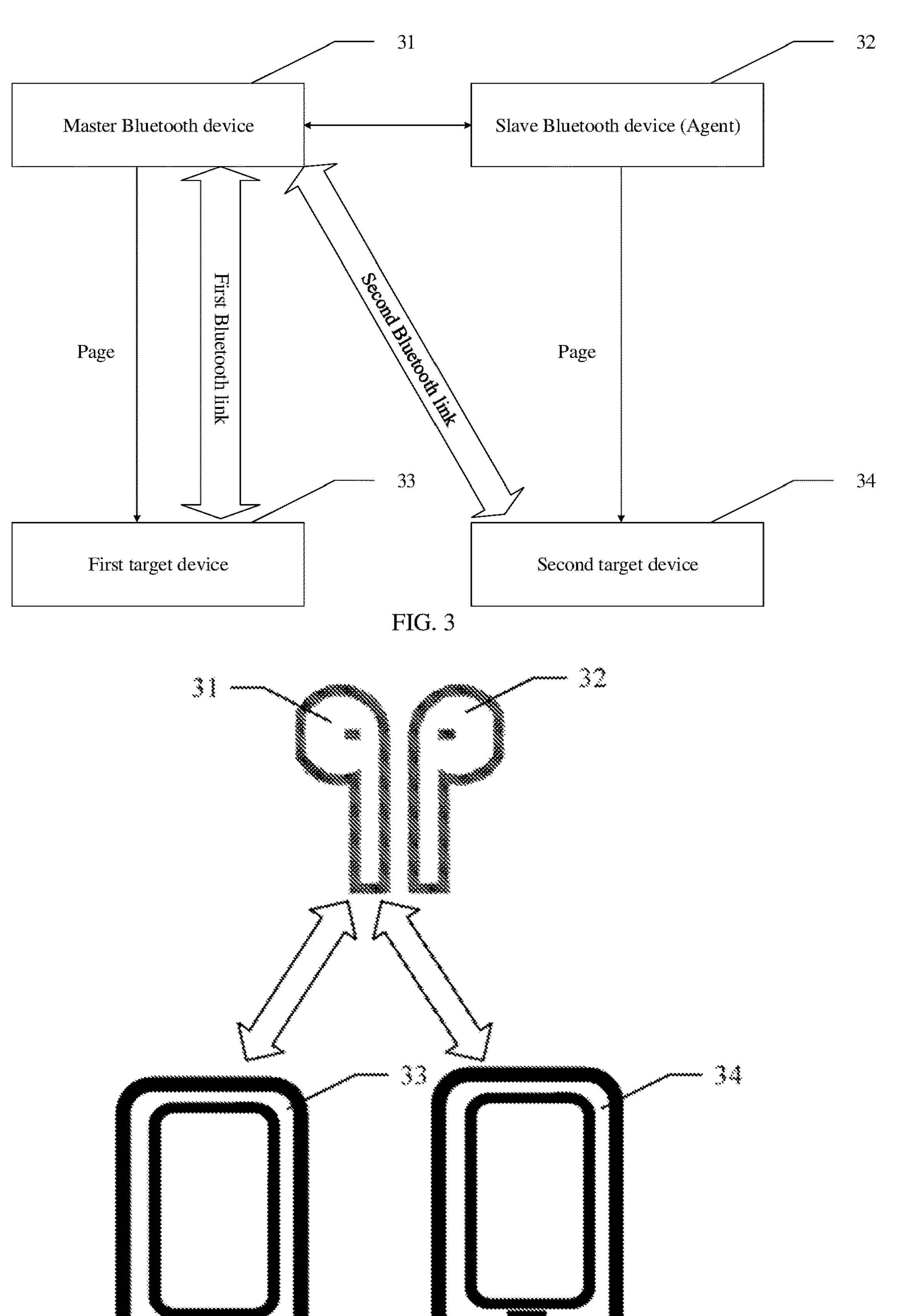
FIG. 3 is a schematic diagram of an implementation environment of a solution according to an embodiment of the present disclosure.
FIG. 4 is a schematic diagram of an implementation environment of a solution according to another embodiment of the present disclosure.

FIG. 3 is a schematic diagram of an implementation environment of a solution according to an embodiment of the present disclosure. The implementation environment of the solution may include: a master Bluetooth device 31, a slave Bluetooth device 32, a first target device 33, and a second target device 34.

The master Bluetooth device 31 is a device that initiates a Bluetooth connection and needs to establish a Bluetooth connection with the first target device 33 and the second target device 34, separately.

In this embodiment of the present disclosure, an establishment process of a connection between the master Bluetooth device 31 and the first target device 33 and an establishment process of a connection between the master Bluetooth device 31 and the second target device 34 may be performed in parallel. On one hand, the master Bluetooth device 31 itself initiates paging to the first target device 33 and establishes a first Bluetooth link with the first target device 33; on the other hand, the master Bluetooth device 31 uses the slave Bluetooth device 32 as its agent device, and the slave Bluetooth device 32 initiates paging to the second target device 34. After the page is successful, the master Bluetooth device 31 establishes a second Bluetooth link with the second target device 34. In this way, limitation that a single device does not support the concurrent page process is surmounted, and an efficient parallel connection is achieved.

The master Bluetooth device 31, the slave Bluetooth device 32, the first target device 33, and the second target device 34 may be any electronic device supporting a Bluetooth function (such as having a Bluetooth chip), including but not limited to an earphone, a mobile phone, a tablet computer, a wearable device, a notebook computer, a vehicle-mounted terminal device, etc.

In an exemplary application scenario, as illustrated in FIG. 4, the master Bluetooth device 31 and the slave Bluetooth device 32 may be left and right earphones of a pair of earphones. The master Bluetooth device is a master Bluetooth earphone, and the slave Bluetooth device is a slave Bluetooth earphone. For example, the master Bluetooth device 31 (or referred to as the master Bluetooth earphone) is the left earphone, and the slave Bluetooth device 32 (or referred to as the slave Bluetooth earphone) is the right earphone; or, the master Bluetooth device 31 (or referred to as the master Bluetooth earphone) is the right earphone, and the slave Bluetooth device 32 (or referred to as the slave Bluetooth earphone) is the left earphone. Optionally, which serves as the master Bluetooth device 31 and which serves as the slave Bluetooth device 32 in the left and right earphones may be determined by negotiation between the two earphones, or may be configured by default, which is not limited in the present disclosure.

Exemplarily, a user has a pair of True Wireless Stereo (TWS) Bluetooth earphones and two mobile phones (denoted as mobile phone #A and mobile phone #B). In an initial state, a left earphone and a right earphone are located in an earphone box, and have no Bluetooth connection to the mobile phone #A or the mobile phone #B. The user opens the earphone box, and the two earphones may use the technical solution provided by the present disclosure. On one hand, a master earphone (such as the left earphone) initiates paging to the mobile phone #A and establishes the Bluetooth link with the mobile phone #A. On the other hand, the master earphone (such as the left earphone) uses a slave earphone (such as the right earphone) as its agent device, and the slave earphone (such as the right earphone) initiates paging to the mobile phone #B. After the page is successful, the master earphone (such as the left earphone) establishes the Bluetooth link with the mobile phone #B. This parallel connection method allows the earphones to reconnect to the two target devices efficiently and quickly after the earphone box is open.

Certainly, in other application scenarios, the master Bluetooth device 31 and the slave Bluetooth device 32 may also be a group of loudspeaker boxes or other Bluetooth devices, which is not limited in the present disclosure.

Figure 5:
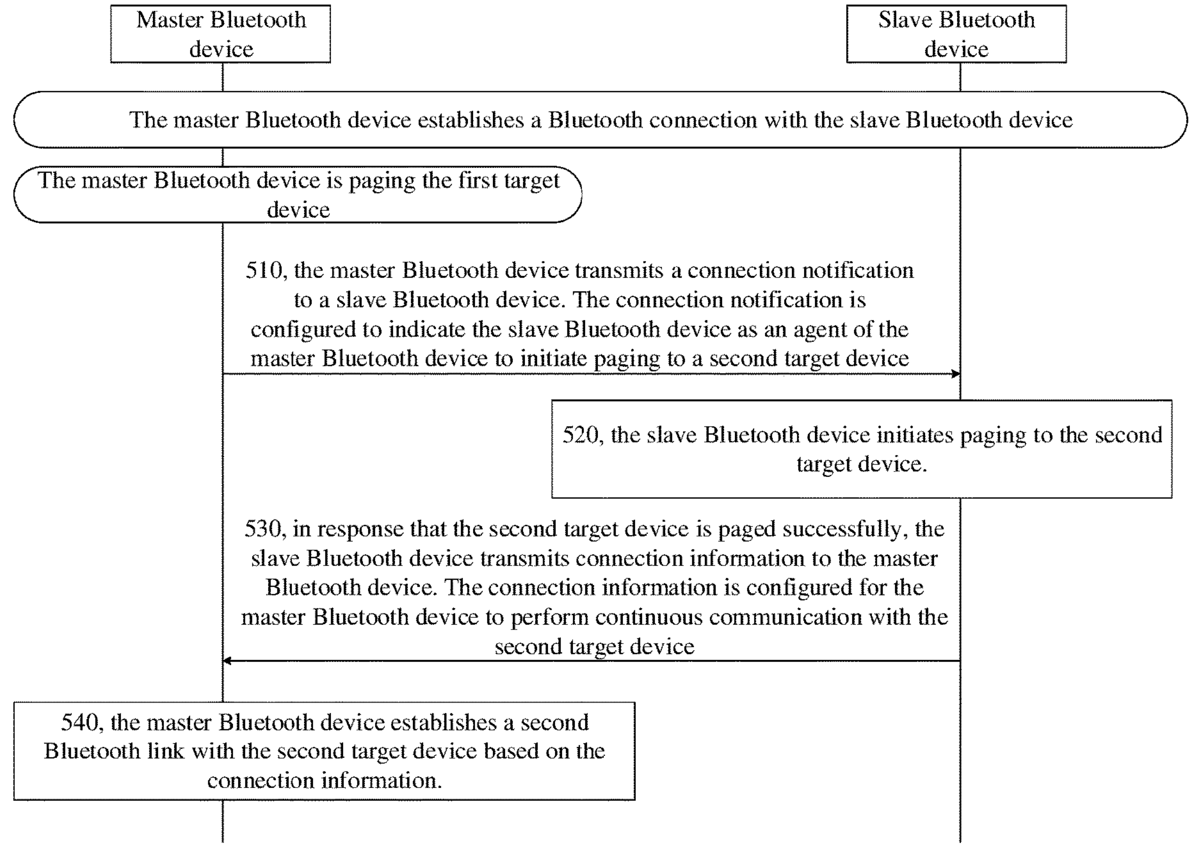
FIG. 5 is a flowchart of a method for establishing a Bluetooth link according to an embodiment of the present disclosure.

FIG. 5 is a flowchart of a method for establishing a Bluetooth link according to an embodiment of the present disclosure. The method may be applied in the implementation environment of the solution illustrated in FIG. 3 and may include the following steps (510 to 540).

At step 510, the master Bluetooth device transmits a connection notification to a slave Bluetooth device. The connection notification is configured to indicate the slave Bluetooth device as an agent of the master Bluetooth device to initiate paging to a second target device.

In order to implement communication between the master Bluetooth device and the slave Bluetooth device, a Bluetooth connection may be established between the master Bluetooth device and the slave Bluetooth device. Optionally, in this embodiment of the present disclosure, a Bluetooth connection between the master Bluetooth device and the slave Bluetooth device is referred to as an inter-device Bluetooth link, and the master Bluetooth device transmits the connection notification to the slave Bluetooth device through the inter-device Bluetooth link.

The single device does not support the concurrent page process. Therefore, in a process where the master Bluetooth device is paging the first target device, the master Bluetooth device may initiate paging to the second target device by using the slave Bluetooth device as its agent device. In this way, the master Bluetooth device may, on the one hand, initiate paging to the first target device and initiate paging to the second target device by means of the slave Bluetooth device, thereby implementing the parallel paging of the two target devices.

Optionally, the connection notification includes the DAC of the second target device, allowing the slave Bluetooth device to learn which device the master Bluetooth device expects to establish the Bluetooth link with.

At step 520, the slave Bluetooth device initiates paging to the second target device.

After receiving the connection notification from the master Bluetooth device, the slave Bluetooth device initiates paging to the second target device.

In an exemplary embodiment, the slave Bluetooth device transmits a page message to the second target device. In response to receiving a slave device first page response from the second target device, the slave Bluetooth device transmits a master device page response to the second target device; and then, in response to receiving a slave device second page response from the second target device, the slave Bluetooth device determines that the second target device is successfully paged, i.e., the slave Bluetooth device performs processes of the steps S1 to S4 illustrated in FIG. 2 and Table 1. Subsequently, the master Bluetooth device executes the steps S5 to S6 illustrated in FIG. 2 and Table 1, to establish the second Bluetooth link between the master Bluetooth device and the second target device.

For this way, in response to receiving no slave device first page response from the second target device, or to receiving no slave device second page response from the second target device, the slave Bluetooth device determines that the second target device fails to be paged. In a case where the second target device fails to be paged, the slave Bluetooth device may transmit a page failure notification to the master Bluetooth device. The page failure notification is configured to indicate that the slave Bluetooth device fails to page the second target device. After receiving the page failure notification from the slave Bluetooth device, the master Bluetooth device may learn that the slave Bluetooth device fails to page the second target device. Subsequently, in response that the master Bluetooth device still intends to establish the Bluetooth link with the second target device, the master Bluetooth device may initiate paging to the second target device itself.

In addition, in response that the slave Bluetooth device performs the foregoing step S3 to transmit the master device page response to the second target device, since the master device page response needs to carry related information of a device (i.e., the master Bluetooth device) actually establishing a connection with the second target device, the slave Bluetooth device needs to first acquire related information of the master Bluetooth device before transmitting the master device page response to the second target device. For example, the related information of the master Bluetooth device may be carried in the connection notification transmitted by the master Bluetooth device to the slave Bluetooth device. Alternatively, after receiving the slave device first page response from the second target device, the slave Bluetooth device transmits an information acquisition request to the master Bluetooth device. The information acquisition request is used to request to acquire the related information of the master Bluetooth device. Correspondingly, after the information acquisition request is received by the master Bluetooth device, the related information of the master Bluetooth device is transmitted to the slave Bluetooth device. Certainly, in other embodiments, the slave Bluetooth device may further obtain the related information of the master Bluetooth device at other suitable occasions, which is not limited in the present disclosure. In addition, the related information of the master Bluetooth device refers to information that needs to be carried in the master device page response, including but not limited to at least one of: LAN Access Point (LAP), Upper Address Portion (UAP), Non-significant Address Portion (NAP), device type, device address (Logical Transport Access Request Address (LT_ADDR)), clock information, page scan mode.

In another exemplary embodiment, the slave Bluetooth device transmits the page message to the second target device; and in response to receiving the slave device first page response from the second target device, the slave Bluetooth device determines that the second target device is paged successfully. That is, the slave Bluetooth device performs processes of the steps S1 and S2 illustrated in FIG. 2 and Table 1. Subsequently, the master Bluetooth device executes the steps S3 to S6 illustrated in FIG. 2 and Table 1, to establish the second Bluetooth link between the master Bluetooth device and the second target device.

For this way, in response to receiving no slave device first page response from the second target device, the slave Bluetooth device determines that the second target device fails to be paged. In the case where the second target device fails to be paged, the slave Bluetooth device may transmit the page failure notification to the master Bluetooth device. The page failure notification is configured to indicate that the slave Bluetooth device fails to page the second target device. After receiving the page failure notification from the slave Bluetooth device, the master Bluetooth device may learn that the slave Bluetooth device fails to page the second target device. Subsequently, in response that the master Bluetooth device still wants to establish the Bluetooth link with the second target device, the master Bluetooth device itself may initiate paging to the second target device.

In addition, for this way, the above step S3 needs to be performed by the master Bluetooth device, rather than being performed by the slave Bluetooth device, to transmit the master device page response to the second target device. Therefore, the related information of the master Bluetooth device introduced above may not necessarily be provided to the slave Bluetooth device.

At step 530, in response that the second target device is paged successfully, the slave Bluetooth device transmits connection information to the master Bluetooth device. The connection information is configured for the master Bluetooth device to perform continuous communication with the second target device.

Optionally, the slave Bluetooth device transmits the connection information to the master Bluetooth device through the inter-device Bluetooth link.

The so-called continuous communication means that the master Bluetooth device may directly use the connection information to communicate with the second target device, rather than needing to initiate paging to the second target device. For example, necessary information required for establishing the Bluetooth link is exchanged, thereby realizing establishment of the Bluetooth link between the master Bluetooth device and the second target device.

Optionally, the connection information includes clock synchronization information configured for enabling the master Bluetooth device to communicate with the second target device at a same frequency point. For example, the clock synchronization information may include clock offset information. Moreover, the master Bluetooth device can adjust its own clock based on the clock offset information, allowing the master Bluetooth device to communicate with the second target device at the same frequency point.

At step 540, the master Bluetooth device establishes a second Bluetooth link with the second target device based on the connection information.

After receiving the connection information from the slave Bluetooth device, the master Bluetooth device establishes the second Bluetooth link with the second target device on the basis of the connection information. In this embodiment of the present disclosure, the Bluetooth link between the master Bluetooth device and the second target device is referred to as the second Bluetooth link.

In an exemplary embodiment, in response that step S3 is executed by the slave Bluetooth device to transmit the master device page response to the second target device, the master Bluetooth device determines a target frequency point based on the connection information, and transmits a Link Manager Protocol (LMP) characteristic exchange request to the second target device at the target frequency point. The LMP characteristic exchange request includes characteristic information of the master Bluetooth device. Moreover, the master Bluetooth device receives an LMP characteristic exchange response from the second target device. The LMP characteristic exchange response includes characteristic information of the second target device. Moreover, the master Bluetooth device saves the characteristic information of the second target device, and transmits an LMP establishment completion message to the second target device. The LMP establishment completion message is configured to indicate that establishment of the second Bluetooth link is completed. That is, after the master Bluetooth device determines the target frequency point on the basis of the connection information, the processes of steps S5 and S6 illustrated in FIG. 2 and Table 1 are executed to complete the establishment process of the Bluetooth link.

In another exemplary embodiment, in response that the master Bluetooth device performs the above step S3 to transmit the master device page response to the second target device, the master Bluetooth device determines a target frequency point based on the connection information, and transmits a master device page response to the second target device at the target frequency point. In response to receiving a slave device second page response from the second target device, an LMP characteristic exchange request is transmitted to the second target device. The LMP characteristic exchange request includes characteristic information of the master Bluetooth device. Moreover, the master Bluetooth device receives an LMP characteristic exchange response from the second target device. The LMP characteristic exchange response includes characteristic information of the second target device. Moreover, the master Bluetooth device saves the characteristic information of the second target device, and transmits an LMP establishment completion message to the second target device. The LMP establishment completion message is configured to indicate that establishment of the second Bluetooth link is completed. That is, after the master Bluetooth device determines the target frequency point based on the connection information, the processes of steps S3 to S6 illustrated in FIG. 2 and Table 1 are executed to complete the establishment process of the Bluetooth link.

Optionally, the master Bluetooth device initiates paging to a first target device. In response that the first target device is paged successfully, the master Bluetooth device establishes a first Bluetooth link with the first target device. An establishment process of the second Bluetooth link is executed in parallel with an establishment process of the first Bluetooth link. In this embodiment of the present disclosure, a Bluetooth link between the master Bluetooth device and the first target device is referred to as the first Bluetooth link, and the establishment process of the first Bluetooth link may refer to the processes of steps S1 to S6 illustrated in FIG. 2 and Table 1.

In summary, according to the technical solution provided in the embodiments of the present disclosure, the master Bluetooth device initiates paging to the target device by using the slave Bluetooth device as the agent thereof, thereby effectively overcoming the limitation that the single Bluetooth device cannot initiate paging to the plurality of target devices concurrently, and enabling the master Bluetooth device to initiate paging to the one target device. In parallel with this, the slave Bluetooth device, serving as the agent for the master Bluetooth device, initiates paging to the other target device, thereby realizing the parallel paging of the two target devices, shortening the time consumed for establishing the plurality of Bluetooth links, and improving the efficiency.

In addition, for the two manners described above, in response that the slave Bluetooth device performs the above step S3 to transmit the master device page response to the second target device, the steps performed by the master Bluetooth device are few, and the slave Bluetooth device takes the steps as much as possible, thereby making full use of processing resources of the slave Bluetooth device, and reducing a processing amount of the master Bluetooth device as much as possible; in response that the master Bluetooth device executes the step S3 to transmit the master device page response to the second target device, the related information of the master Bluetooth device introduced above may not need to be provided to the slave Bluetooth device, which contributes to reducing a signaling overhead between the master and slave Bluetooth devices.

Figure 6:
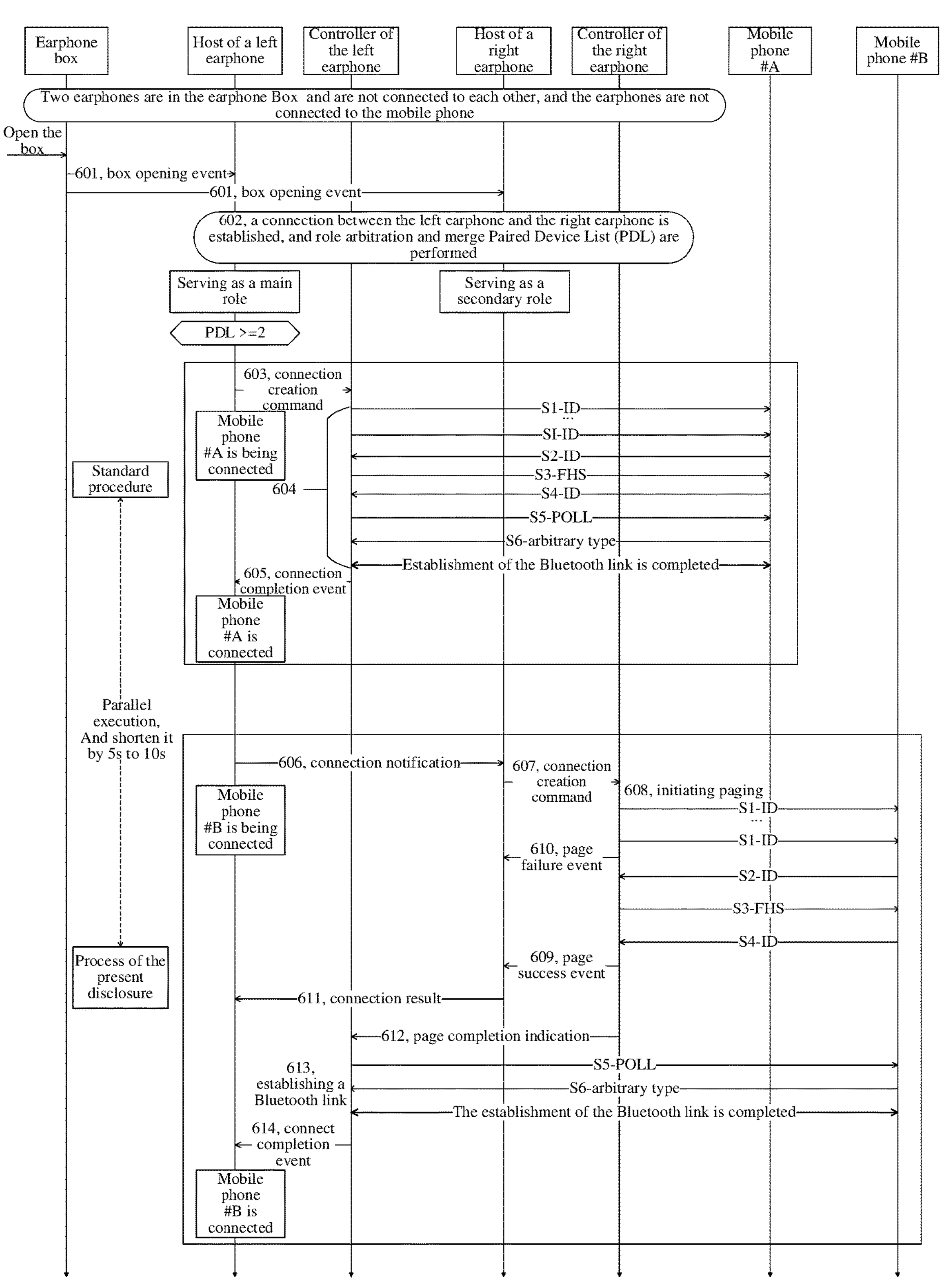
FIG. 6 is a flowchart of a method for establishing a Bluetooth link according to another embodiment of the present disclosure.

FIG. 6 shows a flowchart of a method for establishing a Bluetooth link according to another embodiment of the present disclosure.

In this embodiment, the master Bluetooth device includes a master Bluetooth earphone, and the slave Bluetooth device includes a slave Bluetooth earphone. The method is applied in the implementation environment of the solution illustrated in FIG. 4 for illustration. A predetermined condition includes that: the mobile phone #A and the earphone have been paired, and Bluetooth of the mobile phone #A is turned on or off; the mobile phone #B and the earphone have been paired, and Bluetooth of the mobile phone #B is turned on or off; the left earphone and the right earphone are both in the earphone box; the earphone box is closed; no Bluetooth connection exists between the left earphone and the right earphone; and no Bluetooth connection exists between the left earphone/right earphone and the mobile phone (including the mobile phone #A and the mobile phone #B). A user usage scenario is that: the earphone box is opened, and the earphones automatically reconnects to the mobile phone #A and mobile phone #B.

In order to facilitate flow analysis, each earphone is divided into two parts: a host and a controller. The host is software on an upper layer, and the controller is a hardware module at a bottom layer and is responsible for processing transmitting and receiving of a wireless signal of the Bluetooth technology.

As illustrated in FIG. 6, the method may include the following steps (601 to 614).

At step 601, the user opens the earphone box, and the earphone box transmits a box opening event to the left earphone and the right earphone.

Optionally, the earphone box transmits the box opening event to a host of the left earphone and a host of the right earphone.

At step 602, a connection between the left earphone and the right earphone is established, and role arbitration and merge Paired Device List (PDL) are performed.

An objective of the role arbitration is to determine a role between the two earphones. Optionally, a result of the role arbitration assumes that the left earphone serves as a main role (i.e., the left earphone is the master Bluetooth device), and the right earphone serves as a secondary role (i.e., the right earphone is the slave Bluetooth device)

Taking the TWS earphone as an example, a process of the role arbitration may be as follows: the left earphone transmits its own state information to the right earphone, and the state information includes: (a) whether the left earphone is in a charging box of the earphone, (b) whether the left earphone is connected to the mobile phone, (c) whether a call service is being performed, (d) whether a music service is being performed, or the like. The right earphone combines its own state information with the state information of the left earphone to determine its own role. The right earphone replies to its own role information to the left earphone. It should be noted that for different Bluetooth devices, the process of the role arbitration may be different, which is not limited in the present disclosure.

A purpose of merging the PDL is to merge PDLs of the two earphones together. Since the two earphones may be used separately, it is possible that the two earphones are paired with different devices. For example, the left earphone is paired with the mobile phone #A and saves an address and a key of the mobile phone #A, and the right earphone is paired with the mobile phone #B and saves an address and a key of the mobile phone #B. After this process is completed, both the left earphone and the right earphone store the address and key of the mobile phone #A and the address and key of the mobile phone #B.

Taking the TWS earphone as an example, a process of merging the PDL may be as follows: the left earphone transmits its own pairing record to the right earphone, and the right earphone merges with the PDL and stores the merged PDL. Moreover, the right earphone transmits the merged PDL to the left earphone, and the left earphone stores the merged PDL. It should be noted that for different Bluetooth devices, the process of merging the PDL may be different, which is not limited in the present disclosure.

If a number of paired devices included in the merged PDL is smaller than 2 (denoted as PDL<2), the master earphone (such as the left earphone) only needs to be connected to one target device at most; and if the number of the paired devices included in the merged PDL is greater than or equal to 2 (denoted as PDL≥2), the master earphone (such as the left earphone) at least needs to be connected to two target devices.

FIG. 6 shows a process of PDL≥2, in which for the mobile phone #A, the master earphone (such as the left earphone) manages the connection state, and the master earphone initiates paging to the mobile phone #A. Moreover, for the mobile phone #B, the master earphone (such as the left earphone) manages the connection state, but takes the slave earphone (such as the right earphone) as the agent to initiate paging to the mobile phone #B.

A Bluetooth link establishment process for the mobile phone #A includes steps 603 to 605.

At step 603, the host of the left earphone transmits a connection creation command to a controller of the left earphone.

For example, the connection creation command may be a standard HCI_Create_Connection command.

At step 604, the processes of steps S1 to S6 are performed between the controller of the left earphone and the mobile phone #A, to establish a Bluetooth link between the left earphone and the mobile phone #A.

At step 605, after the Bluetooth link is established, the controller of the left earphone transmits a connection completion event to the host of the left earphone.

For example, the connection completion event may be a standard HCI_Connection_Complete event.

A Bluetooth link establishment process for the mobile phone #B includes steps 606 to 614.

At step 606, the host of the left earphone transmits the connection notification to the host of the right earphone. The connection notification is configured to indicate that the right earphone is an agent of the left earphone for initiating paging to the mobile phone #B.

At step 607, the host of the right earphone transmits the connection creation command to a controller of the right earphone.

Optionally, the connection creation command may be the standard HCI_Create_Connection command or a private Create_Connection command.

At step 608, the controller of the right earphone initiates paging to the mobile phone #B.

At step 609, in response that the mobile phone #B is paged successfully, the controller of the right earphone transmits a page success event to the host of the right earphone.

Optionally, the page success event may be a Page_Complete Event-Success or a Vendor_Connection_Complete Event—Page Success.

At step 610, in response that the mobile phone #B fails to be paged, the controller of the right earphone transmits a page failure event to the host of the right earphone.

Optionally, the page failure event may be a Page_Complete Event-Timeout or a Vendor_Connection_Complete Event—Page Timeout.

At step 611, the host of the right earphone transmits a connection result to the host of the left earphone.

Optionally, in a case where the host of the right earphone receives the page success event, the host of the right earphone transmits a connection success result (also referred to as a page success notification) to the host of the left earphone and carries the connection information. The connection information includes the clock synchronization information configured for enabling the left earphone to communicate with the mobile phone #B at the same frequency point; and in a case where the host of the right earphone receives the page failure event, the host of the right earphone transmits a connection failure result (which may also be referred to as the page failure notification) to the host of the left earphone. Optionally, the connection information may further include information such as address information and a device type. This embodiment of the present disclosure does not limit this thereto.

At step 612, the controller of the right earphone transmits a page completion indication to the controller of the left earphone.

Optionally, the page completion indication may be a Page_Complete indication.

At step 613, processes of the above steps 5 and 6 are performed between the controller of the left earphone and the mobile phone #B to establish a Bluetooth link between the left earphone and the mobile phone #B.

For example, the characteristic information is exchanged between the left earphone and the right earphone, and the LMP establishment completion message is transmitted.

At step 614, after the establishment of the Bluetooth link is completed, the controller of the left earphone transmits the connection completion event to the host of the left earphone.

For example, the connection completion event may be a Connection_Complete event.

It should be noted that some messages or events involved in this embodiment are merely exemplary and explanatory, and the name may be arranged based on a predetermined specification or requirement, which is not limited in the present disclosure.

In addition, in this embodiment, as an example, only the slave earphone (i.e., the right earphone) is used to execute the step S3 to transmit the main device page response to the mobile phone #B, i.e., the slave earphone (i.e., the right earphone) executes steps S1 to S4, the master earphone (i.e., the left earphone) continues to execute steps S5 and S6, and finally a Bluetooth link between the master earphone (i.e., the left earphone) and the mobile phone #B is established. In other embodiments, the step S3 may also be executed by the master earphone (i.e., the left earphone) to transmit the main device page response to the mobile phone #B, i.e., the slave earphone (i.e., the right earphone) executes steps S1 and S2, the master earphone (i.e., the left earphone) continuously executes steps S3 and S6, and finally the Bluetooth link between the master earphone (i.e., the left earphone) and the mobile phone #B is established. For specific description of the two manners, reference may be made to the above embodiments, and details are omitted herein again.

By using the technical solution provided in the present disclosure, a connection requirement is transmitted to the slave earphone by means of a customized private instruction (a connection notification that is transmitted by the master earphone to the slave earphone), which realizes a parallel connection of the two target devices (such as the two mobile phones). Moreover, compared with a serial connection scheme in the related art, a forward income of 5 s to 10 s can be obtained, thereby improving the user experience.

It is to be noted that, in the above method embodiments, the technical solutions of the present disclosure have been introduced and explained mainly from the perspective of interaction between the master Bluetooth device and the slave Bluetooth device. The above steps performed by the master Bluetooth device can be separately implemented as a method for establishing a Bluetooth link in a master Bluetooth device. The above steps performed by the slave Bluetooth device can be implemented separately as a method for establishing a Bluetooth link in a slave Bluetooth device.

The apparatus embodiments of the present disclosure will be described below, which can be used to execute the method embodiments of the present disclosure. For details not disclosed in the apparatus embodiments of the present disclosure, reference can be made to the method embodiments of the present disclosure.

Figure 7:
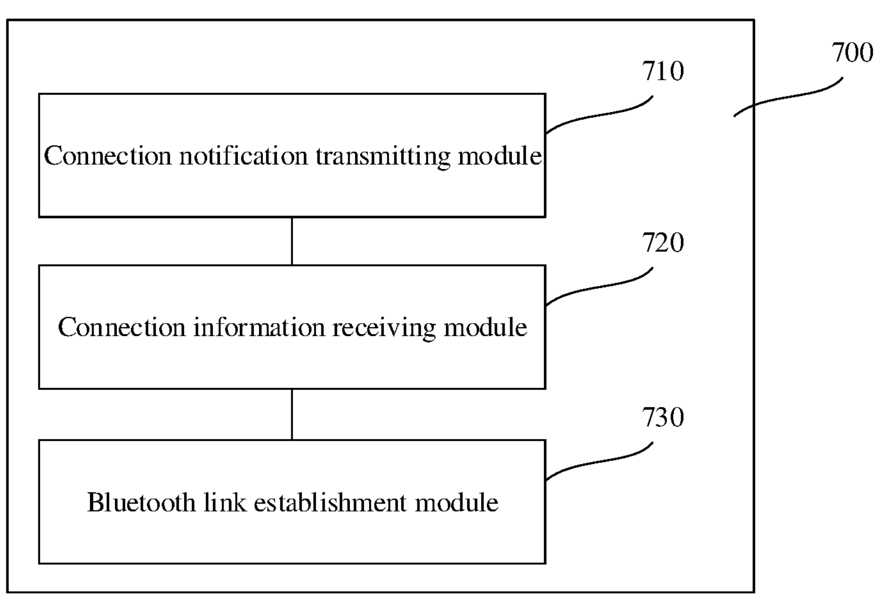
FIG. 7 is a block diagram of an apparatus for establishing a Bluetooth link according to an embodiment of the present disclosure.

FIG. 7 shows a block diagram of an apparatus for establishing a Bluetooth link according to an embodiment of the present disclosure. The apparatus has the function of implementing the above method examples at the master Bluetooth device. The function may be implemented by hardware, or by executing corresponding software by hardware. The apparatus may be the master Bluetooth device introduced above or may be disposed in the master Bluetooth device. The apparatus 700 may include: a connection notification transmitting module 710, a connection information receiving module 720, and a Bluetooth link establishment module 730.

The connection notification transmitting module 710 is configured to transmit a connection notification to a slave Bluetooth device. The connection notification is configured to indicate the slave Bluetooth device as an agent of the master Bluetooth device to initiate paging to a second target device.

The connection information receiving module 720 is configured to receive connection information from the slave Bluetooth device. The connection information is configured for the master Bluetooth device to perform continuous communication with the second target device.

The Bluetooth link establishment module 730 is configured to establish a second Bluetooth link with the second target device based on the connection information.

In an exemplary embodiment, the Bluetooth link establishment module 730 is configured to: determine a target frequency point based on the connection information; transmit a link manager protocol (LMP) characteristic exchange request to the second target device at the target frequency point, the LMP characteristic exchange request including characteristic information of the master Bluetooth device; receive an LMP characteristic exchange response from the second target device, the LMP characteristic exchange response including characteristic information of the second target device; and save the characteristic information of the second target device, and transmit an LMP establishment completion message to the second target device, the LMP establishment completion message being configured to indicate that establishment of the second Bluetooth link is completed.

In an exemplary embodiment, the Bluetooth link establishment module 730 is configured to: determine a target frequency point based on the connection information; transmit a master device page response to the second target device at the target frequency point; transmit, in response to receiving a slave device second page response from the second target device, an LMP characteristic exchange request to the second target device, the LMP characteristic exchange request including characteristic information of the master Bluetooth device; receive an LMP characteristic exchange response from the second target device, the LMP characteristic exchange response including characteristic information of the second target device; and save the characteristic information of the second target device, and transmitting an LMP establishment completion message to the second target device. The LMP establishment completion message is configured to indicate that establishment of the second Bluetooth link is completed.

In an exemplary embodiment, the connection information includes clock synchronization information used for enabling the master Bluetooth device to communicate with the second target device at a same frequency point.

In an exemplary embodiment, the apparatus 700 further includes a failure notification receiving module configured to receive a page failure notification from the slave Bluetooth device. The page failure notification is configured to indicate that the slave Bluetooth device fails to page the second target device.

In an exemplary embodiment, the apparatus 700 further includes a page initiating module configured to initiate paging to a first target device.

The Bluetooth link establishment module 730 is configured to establish, in response that the first target device is paged successfully, a first Bluetooth link with the first target device.

Here, an establishment process of the second Bluetooth link is executed in parallel with an establishment process of the first Bluetooth link.

In an exemplary embodiment, the master Bluetooth device includes a master Bluetooth earphone, and the slave Bluetooth device includes a slave Bluetooth earphone.

Figure 8:
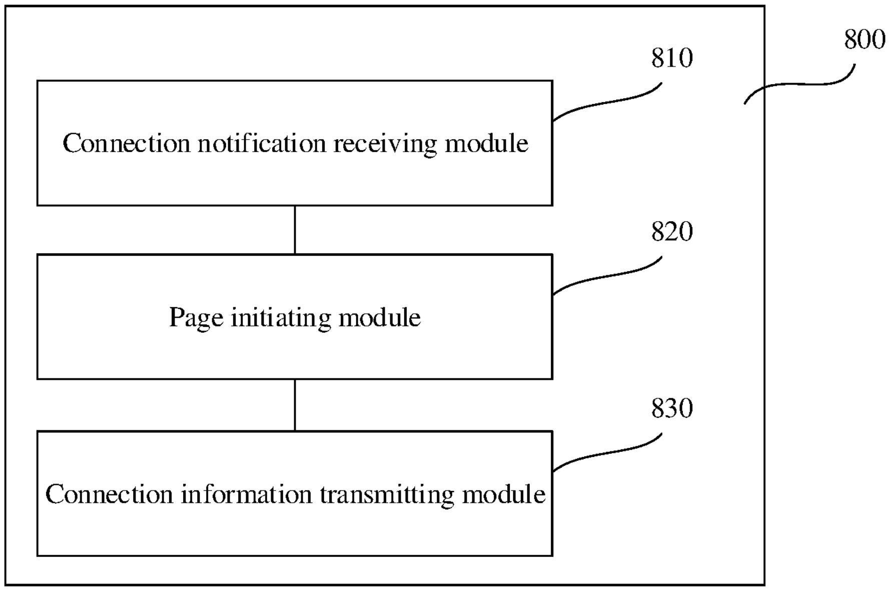
FIG. 8 is a block diagram of an apparatus for establishing a Bluetooth link according to another embodiment of the present disclosure.

FIG. 8 shows a block diagram of an apparatus for establishing a Bluetooth link according to another embodiment of the present disclosure. The apparatus has the function of implementing the above method examples at the slave Bluetooth device. The function may be implemented by hardware, or by executing corresponding software by hardware. The apparatus may be the slave Bluetooth device introduced above or may be disposed in the slave Bluetooth device. The apparatus 800 may include: a connection notification receiving module 810, a page initiating module 820, and a connection information transmitting module 830.

The connection notification receiving module 810 is configured to receive a connection notification from a master Bluetooth device. The connection notification is configured to indicate the slave Bluetooth device as an agent of the master Bluetooth device to initiate paging to a second target device.

The page initiating module 820 is configured to initiate paging to the second target device.

The connection information transmitting module 830 is configured to transmit, in response that the second target device is paged successfully, connection information to the master Bluetooth device. The connection information is configured for the master Bluetooth device to perform continuous communication with the second target device, to establish a second Bluetooth link between the master Bluetooth device and the second target device.

In an exemplary embodiment, the page initiation module 820 is configured to: transmit a page message to the second target device; transmit, in response to receiving a slave device first page response from the second target device, a master device page response to the second target device; and determine, in response to receiving a slave device second page response from the second target device, that the second target device is successfully paged.

In an exemplary embodiment, the page initiation module 820 is configured to: transmit a page message to the second target device; and determine, in response to receiving a slave device first page response from the second target device, that the second target device is successfully paged.

In an exemplary embodiment, the connection information includes clock synchronization information configured for enabling the master Bluetooth device to communicate with the second target device at a same frequency point.

In an exemplary embodiment, the apparatus 800 further includes a failure notification transmitting module configured to transmit, in response that the second target device fails to be paged, a page failure notification to the master Bluetooth device. The page failure notification is configured to indicate that the slave Bluetooth device fails to page the second target device.

In an exemplary embodiment, an establishment process of the second Bluetooth link is executed in parallel with an establishment process of the first Bluetooth link, and the first Bluetooth link includes a Bluetooth link between the master Bluetooth device and the first target device.

In an exemplary embodiment, the master Bluetooth device includes a master Bluetooth earphone, and the slave Bluetooth device includes a slave Bluetooth earphone.

It is to be noted that, when the apparatuses according to the above embodiments implement their respective functions, the division of the above functional modules is used as an example for illustration only. In actual applications, the above functions can be allocated to different functional modules according to actual needs. That is, the content structure of each apparatus may be divided into different functional modules to complete all or part of the functions described above. In addition, the apparatus according to the above embodiments belongs to a same concept as the method embodiments, and thus the detailed description of the specific implementation of the apparatus may refer to that of the method embodiment, and details thereof will be omitted herein.

Figure 9:
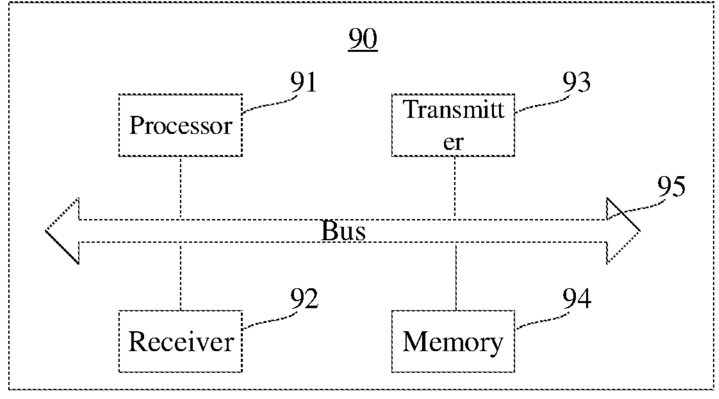
FIG. 9 is a structural block diagram of a Bluetooth device according to an embodiment of the present disclosure.

FIG. 9 shows a structural block diagram of a Bluetooth device according to an embodiment of the present disclosure. For example, the Bluetooth device can be configured to perform the function of the method for establishing the Bluetooth link. The Bluetooth device 90 may include: a processor 91, a receiver 92, a transmitter 93, a memory 94, and a bus 95.

The processor 91 includes one or more processing cores, and implements various functional applications and information processing by executing software programs and modules.

The receiver 92 and the transmitter 93 may be implemented as a communication component, which may be a communication chip.

The memory 94 is connected to the processor 91 through the bus 95.

The memory 94 can store a computer program and can be configured to execute the computer program, so as to implement various steps in the above method embodiments.

In addition, the memory 94 can be implemented by any type of volatile or non-volatile storage device or any combination thereof, the volatile or non-volatile storage device including, but not limited to: Random-Access Memory (RAM), Read-Only Memory (ROM), Erasable Programmable Read-Only Memory (EPROM), Electrically Erasable Programmable Read-Only Memory (EEPROM), flash memory or other solid state storage technology, Compact Disc Read-Only Memory (CD-ROM), Digital Video Disc (DVD) or other optical storage, cassette, magnetic tape, magnetic disk storage or other magnetic storage device.

In an exemplary embodiment, further provided is a computer-readable storage medium. The storage medium has a computer program stored therein. The computer program, when executed by a processor of the Bluetooth device, implements the method for establishing the Bluetooth link described above. Optionally, the computer-readable storage medium may include: a ROM, a RAM, a Solid State Drives (SSD), or an optical disc. A random access memory may include a Resistance Random Access Memory (ReRAM) and a Dynamic Random Access Memory (DRAM).

In an exemplary embodiment, further provided is a computer program product including computer instructions stored in a computer-readable storage medium. The processor of the Bluetooth device reads the computer instructions from the computer-readable storage medium and executes the computer instructions, enabling the Bluetooth device to implement the method for establishing the Bluetooth link described above.

It should be understood that "a plurality of" referred to herein means two or more. The expression "and/or" describes the association relationship of the associated objects and expresses that three kinds of relationships may exist. For example, A and/or B may indicate that three cases where A exists independently, A and B exist at the same time, and B exists independently. The character "/" generally indicates that the associated objects before and after the character are in an "or" relationship. In addition, the steps described herein merely exemplarily show one possible execution sequence between steps. In other embodiments, the above steps may also not be performed in a numeral order. For example, the steps of two different numbers are executed simultaneously, or the steps of two different numbers are executed in a reverse order from the illustration, which is not limited in the embodiments of the present disclosure.

The above are only exemplary embodiments of the present disclosure, and are not intended to limit the present disclosure. Any modification, equivalent replacement, improvement, etc. made within the spirit and principle of the present disclosure shall be included in the protection scope of the present disclosure.

What is claimed is:

1. A method for establishing a Bluetooth link in a master Bluetooth device, comprising:

transmitting a connection notification to a slave Bluetooth device, the connection notification being configured to indicate the slave Bluetooth device as an agent of the master Bluetooth device to initiate paging to a second target device;

receiving connection information from the slave Bluetooth device, the connection information being configured for the master Bluetooth device to perform continuous communication with the second target device; and establishing a second Bluetooth link with the second target device based on the connection information;

wherein the establishing the second Bluetooth link with the second target device based on the connection information comprises:

determining a target frequency point based on the connection information; transmitting a link manager protocol (LMP) characteristic exchange request to the second target device at the target frequency point, the LMP characteristic exchange request comprising characteristic information of the master Bluetooth device; receiving an LMP characteristic exchange response from the second target device, the LMP characteristic exchange response comprising characteristic information of the second target device; and saving the characteristic information of the second target device, and transmitting an LMP establishment completion message to the second target device, the LMP establishment completion message being configured to indicate that establishment of the second Bluetooth link is completed; or determining a target frequency point based on the connection information; transmitting a master device page response to the second target device at the target frequency point; transmitting, in response to receiving a slave device second page response from the second target device, an LMP characteristic exchange request to the second target device, the LMP characteristic exchange request comprising characteristic information of the master Bluetooth device; receiving an LMP characteristic exchange response from the second target device, the LMP characteristic exchange response comprising characteristic information of the second target device; and saving the characteristic information of the second target device, and transmitting an LMP establishment completion message to the second target device, the LMP establishment completion message being configured to indicate that establishment of the second Bluetooth link is completed.

2. The method according to claim 1, wherein the connection information comprises clock synchronization information used for enabling the master Bluetooth device to communicate with the second target device at a same frequency point.

3. The method according to claim 1, further comprising: receiving a page failure notification from the slave Bluetooth device, the page failure notification being configured to indicate that the slave Bluetooth device fails to page the second target device.

4. The method according to claim 1, further comprising initiating paging to a first target device; and establishing, in response that the first target device is paged successfully, a first Bluetooth link with the first target device, wherein:

an establishment process of the second Bluetooth link is executed in parallel with an establishment process of the first Bluetooth link.

5. The method according to claim 1, wherein the master Bluetooth device comprises a master Bluetooth earphone, and the slave Bluetooth device comprises a slave Bluetooth earphone.

6. A master Bluetooth device, comprising a processor and a memory having a computer program stored therein, the computer program, when executed by the processor, implementing a method for establishing a Bluetooth link in the master Bluetooth device, comprising:

transmitting a connection notification to a slave Bluetooth device, the connection notification being configured to indicate the slave Bluetooth device as an agent of the master Bluetooth device to initiate paging to a second target device;

receiving connection information from the slave Bluetooth device, the connection information being configured for the master Bluetooth device to perform continuous communication with the second target device; and establishing a second Bluetooth link with the second target device based on the connection information;

wherein the establishing the second Bluetooth link with the second target device based on the connection information comprises:

determining a target frequency point based on the connection information; transmitting a link manager protocol (LMP) characteristic exchange request to the second target device at the target frequency point, the LMP characteristic exchange request comprising characteristic information of the master Bluetooth device; receiving an LMP characteristic exchange response from the second target device, the LMP characteristic exchange response comprising characteristic information of the second target device; and saving the characteristic information of the second target device, and transmitting an LMP establishment completion message to the second target device, the LMP establishment completion message being configured to indicate that establishment of the second Bluetooth link is completed; or determining a target frequency point based on the connection information; transmitting a master device page response to the second target device at the target frequency point; transmitting, in response to receiving a slave device second page response from the second target device, an LMP characteristic exchange request to the second target device, the LMP characteristic exchange request comprising characteristic information of the master Bluetooth device; receiving an LMP characteristic exchange response from the second target device, the LMP characteristic exchange response comprising characteristic information of the second target device; and saving the characteristic information of the second target device, and transmitting an LMP establishment completion message to the second target device, the LMP establishment completion message being configured to indicate that establishment of the second Bluetooth link is completed.

7. The master Bluetooth device according to claim 6, wherein the connection information comprises clock synchronization information used for enabling the master Bluetooth device to communicate with the second target device at a same frequency point.

8. The master Bluetooth device according to claim 6, wherein the computer program, when executed by the processor, implements the method for establishing a Bluetooth link in the master Bluetooth device, further comprising:

receiving a page failure notification from the slave Bluetooth device, the page failure notification being configured to indicate that the slave Bluetooth device fails to page the second target device.

9. The master Bluetooth device according to claim 6, wherein the computer program, when executed by the processor, implements the method for establishing a Bluetooth link in the master Bluetooth device, further comprising:

initiating paging to a first target device; and establishing, in response that the first target device is paged successfully, a first Bluetooth link with the first target device, wherein:

an establishment process of the second Bluetooth link is executed in parallel with an establishment process of the first Bluetooth link.

10. The master Bluetooth device according to claim 6, wherein the master Bluetooth device comprises a master Bluetooth earphone, and the slave Bluetooth device comprises a slave Bluetooth earphone.

* * * * *